United States Patent
Feng et al.

[11] Patent Number: 6,118,096
[45] Date of Patent: Sep. 12, 2000

[54] LASER MARKING OF PHOSPHORESCENT PLASTIC ARTICLES

[75] Inventors: Ke Feng, Lilburn; Jerry Alan Bodi, Suwanee, both of Ga.

[73] Assignee: M. A. HannaColor, a division of M. A. Hanna Company, Suwanee, Ga.

[21] Appl. No.: 09/322,548

[22] Filed: May 28, 1999

Related U.S. Application Data

[62] Division of application No. 08/991,705, Dec. 16, 1997.

[51] Int. Cl.$^7$ .................................................. B23K 26/00
[52] U.S. Cl. ............................... 219/121.69; 219/121.68; 219/121.67; 264/21
[58] Field of Search ....................... 219/121.69, 121.68, 219/121.67, 121.85; 264/21, 400

[56] References Cited

U.S. PATENT DOCUMENTS

| | | |
|---|---|---|
| 3,832,556 | 8/1974 | Schroeder . |
| 3,879,611 | 4/1975 | Schroeder . |
| 3,978,340 | 8/1976 | Schroeder . |
| 4,035,652 | 7/1977 | Schroeder . |
| 4,070,763 | 1/1978 | Carts, Jr. . |
| 4,092,518 | 5/1978 | Merard . |
| 4,414,974 | 11/1983 | Dotson et al. . |
| 4,629,583 | 12/1986 | Goguen . |
| 4,640,797 | 2/1987 | Goguen . |
| 4,654,290 | 3/1987 | Spanjer . |
| 4,769,257 | 9/1988 | Duley et al. . |
| 4,861,620 | 8/1989 | Azuma et al. . |
| 4,914,554 | 4/1990 | Sowers . |
| 4,928,212 | 5/1990 | Benavides . |
| 4,933,205 | 6/1990 | Duley et al. . |
| 5,007,647 | 4/1991 | Gulick . |
| 5,030,551 | 7/1991 | Herren et al. ............................. 430/495 |
| 5,053,440 | 10/1991 | Schueler et al. . |
| 5,053,930 | 10/1991 | Benavides . |
| 5,063,137 | 11/1991 | Kiyonari et al. . |
| 5,073,843 | 12/1991 | Magee . |

(List continued on next page.)

FOREIGN PATENT DOCUMENTS

| | | |
|---|---|---|
| 1284125 | 5/1991 | Canada . |
| 2179698 | 12/1996 | Canada . |
| 0 572 178 | 12/1993 | European Pat. Off. . |
| 0 669 365 | 8/1995 | European Pat. Off. . |
| 0 675 168 | 10/1995 | European Pat. Off. . |
| 0 680 831 | 11/1995 | European Pat. Off. . |
| 0 684 144 | 11/1995 | European Pat. Off. . |
| 0 710 570 | 5/1996 | European Pat. Off. . |
| 0 750 012 | 12/1996 | European Pat. Off. . |
| 2 633 418 | 12/1989 | France . |
| 42 35 302 | 4/1994 | Germany . |
| 62-192460 | 8/1987 | Japan . |
| 6-297828 | 10/1994 | Japan . |
| 7-161878 | 6/1995 | Japan . |
| 8-127175 | 5/1996 | Japan . |
| WO 95/30716 | 11/1995 | WIPO . |

*Primary Examiner*—Patrick Ryan
*Assistant Examiner*—M. Alexandra Elve
*Attorney, Agent, or Firm*—Jones, Day, Reavis & Pogue

[57] ABSTRACT

The invention provides molded, extruded or formed phosphorescent plastic articles having laser marked indicia and methods for preparing the articles. The indicia may be seen as a contrast against a phosphorescent background or, alternatively, the indicia may themselves be phosphorescent. An article of the invention has a composition comprising about 50% to about 99% by weight of a thermoplastic or thermosetting resin, about 1% to about 50% by weight of a phosphorescent phosphor pigment and about 0.001% to about 1% by weight of a laser energy absorbing additive. Resin compositions which themselves are laser energy absorbing do not require the additive; however, the addition of small quantities of the laser energy additive enhances the quality and contrast of the laser mark. The composition may further comprise small quantities of one or more of a whitening pigment, a lubricating agent, or an inert filler without interfering with the phosphorescence of the article and/or the quality and contrast of the laser mark.

18 Claims, 7 Drawing Sheets

U.S. PATENT DOCUMENTS

| | | |
|---|---|---|
| 5,075,195 | 12/1991 | Bäbler et al. . |
| 5,135,591 | 8/1992 | Vockel, Jr. et al. . |
| 5,149,938 | 9/1992 | Winston et al. ................... 219/121.69 |
| 5,217,763 | 6/1993 | Boury . |
| 5,220,166 | 6/1993 | Takeuchi et al. . |
| 5,223,330 | 6/1993 | Vockel, Jr. et al. . |
| 5,248,878 | 9/1993 | Ihara . |
| 5,262,470 | 11/1993 | Shimotsuma et al. . |
| 5,266,771 | 11/1993 | Van Wyk . |
| 5,330,195 | 7/1994 | Gulick . |
| 5,346,802 | 9/1994 | Ohbachi et al. . |
| 5,424,006 | 6/1995 | Murayama et al. . |
| 5,445,923 | 8/1995 | Takahashi et al. . |
| 5,489,639 | 2/1996 | Faber et al. . |
| 5,576,377 | 11/1996 | El Sayed et al. . |
| 5,578,120 | 11/1996 | Takahashi et al. . |
| 5,588,736 | 12/1996 | Shea, Sr. . |
| 5,655,826 | 8/1997 | Kouno et al. . |
| 5,719,372 | 2/1998 | Togari et al. . |
| 5,817,243 | 10/1998 | Shaffer ..................................... 216/65 |
| 5,840,791 | 11/1998 | Magerstedt et al. . |

LASER MARKING OF PHOSPHORESCENT PLASTIC ARTICLES

This appln is a Div. of Ser. No. 08/991,705 filed Dec. 16, 1997.

BACKGROUND OF THE INVENTION

Laser marking is a well known and important means for quickly and cleanly inscribing plastic surfaces with permanent informational indicia marks, such as date codes, batch codes, bar codes or part numbers, functional marks, such as computer keyboard and electronic keypad characters, and decorative marks, such as company logos. However, such laser marks are visible and readable only in lighted environments. The inability to read informational indicia on these and other items, such as clocks, emergency exit signs, safety information signboards, interior automobile control buttons, and the like, in a dark or dimly lit environment is a common problem in modern society. As used in the context of the invention, the term "indicia" refers to any laser mark whatsoever including, but not limited to, alphabetical characters, numbers, drawings, patterns, and the like.

It has been the practice to enable visibility of indicia in the dark by providing electrically powered illumination systems. Some illumination devices are self-contained, having a battery and light which clips onto the article to provide external illumination. Other systems rely on a light source within the article, the light being projected through the wall of the article to provide "back light" illumination of the indicia thereon or of the area immediately surrounding the indicia to provide contrast. Other devices utilize an optical conductor to transmit illumination from a light source to, for example, the keys of a key pad. Such illumination systems, however, whether battery powered or electrically wired, add bulkiness, weight, expense and maintenance costs to the item. Moreover, in cases of power outages, electrically wired systems are useless and many safety items, such as emergency exit signs, require back-up battery systems.

The use of phosphorescent materials in the production of luminescent articles is very well known, having been used for such diverse "glow-in-the-dark" items as golf balls, rubber shoe soles, many varieties of toys, safety helmets, safety tape for bicycle visibility, and the like. Phosphorescent phosphors are substances that emit light after having absorbed ultraviolet radiation or the like, and the afterglow of the light that can be visually observed continues for a considerable time, ranging from several tens of minutes to several hours after the source of the stimulus is cut off. Phosphorescent materials have been reported for use as night-time illumination for vehicle parts, such as wheel valve stem caps, gear shift knobs, or for phosphorescent tabs for illuminating keyholes. They have also been used for night-time illumination of plastic electronic key pads that contain informational indicia attached to the key pads by an adhesive.

Although fluorescent pigments and dyes have been employed in plastic materials suitable for laser marking, it has not previously been considered possible to laser mark indicia on phosphorescent plastic articles. The most common mechanism of laser marking of plastic materials depends on the rapid production of heat in the irradiated portion of the plastic due to the absorption of the laser energy. Many plastics, such as polyethylene, polypropylene and polystyrene, are transparent to laser energy at certain wavelengths, and many other plastics do not absorb laser energy well. In order to laser mark plastics such as these, it is necessary to incorporate laser energy absorbing additives, such as clay, talc, titanium dioxide, carbon black, barium sulfate, and the like, into the polymeric composition. However, it was believed that incorporation of such laser energy absorbing additives into phosphorescent plastic compositions would mask the phosphorescence or, at the least, significantly interfere with the intensity of the phosphorescence and the duration of the afterglow, requiring uneconomically large quantities of these expensive phosphorescent phosphors to overcome the masking effect of the fillers.

Moreover, until recently, the commonly available phosphorescent phosphors, such as sulfide phosphorescent phosphors, were capable of emitting a visible afterglow that lasted only from about 30 minutes to about 2 hours and their use required repeated exposure to a light stimulus in order for the afterglow to be sustained for practical time period. Such sulfide phosphorescent phosphors include CaS:Bi (which emits violet blue light), CaStS:Bi (which emits blue light), ZnS:Cu (which emits green light) and ZnCdS:Cu (which emits yellow or orange light). Because of the short afterglow duration of these phosphors, there were concerns about diminishing the luminescence and afterglow time by adding laser energy absorbing fillers to polymer compositions containing these phosphorescent phosphors.

Recently, however, a new group of phosphorescent phosphors that both absorb and emit light in the visible spectrum has become available (see U.S. Pat. No. 5,424,006). These phosphors comprise a matrix expressed by $MAl_2O_4$ (where M is a metal such as calcium, strontium, or barium) doped with at least one other element, such as europium, ytterbium, dysprosium, thulium, erbium, or the like, to form a phosphorescent phosphor (e.g., $SrAl_2O_4$:Eu). These phosphors have a crystalline structure and they are highly chemically stable metal oxides. The new phosphors have an afterglow that is three to more than twelve times brighter than that of the comparable sulfide based phosphorescent phosphors at 10 minutes after stimulation, and 17 to more than 37 times brighter at 100 minutes after stimulation. Moreover, the afterglow of these phosphors is still visibly apparent 15 to 24 hours after stimulation. The suggested uses for these phosphorescent phosphors include phosphorescent articles such as signs, luminous inks, toys, directional markers, and backlighting for liquid-crystal items such as clocks, electrical appliance switches, key hole indicators, and the like, but there is no suggestion that plastic articles containing these or similar phosphorescent phosphors may be suitable for laser marking.

Another group of phosphorescent phosphors containing neodymium and ytterbium ions has also been recently described. These phosphors absorb light in the visible spectrum and emit light in the infrared spectrum (see U.S. Pat. No. 5,220,166) and reportedly can be incorporated into plastic materials during manufacture, into paints used as coatings, or into ink compositions for printing. The infrared light emitted by the phosphor is detected by a photodetector device, such as a bar code reader, credit card/bank card reader, and the like. However, there is no suggestion that indicia can be laser marked on such phosphorescent plastics.

SUMMARY OF THE INVENTION

It has been unexpectedly discovered that phosphorescent plastic articles comprising polymer compositions that also contain laser energy absorbing additives, with or without the addition of inert fillers, pigments and/or other additives, can be laser marked and, contrary to conventional expectations, the addition of these laser energy absorbing additives, fillers and/or pigments, and the like, in the concentrations according to the invention, does not interfere with the resulting phosphorescence of the article. Molded, extruded or formed plastic articles containing laser energy absorbing additives and phosphorescent phosphor pigments that emit light in the visible wavelength range can be laser marked to provide permanent informational and other indicia that are visible with high contrast in light environments and are also visible in the dark with high contrast against a phosphorescent plastic background. Any thermoplastic or thermosetting resin that is conventionally used in producing plastic articles suitable for laser marking may be used in the composition of the invention to produce a laser-markable phosphorescent plastic article.

In particular, it has been discovered that laser energy absorbing additives, such as mica-based additives, carbon black, titanium dioxide, barium sulfate, talc, china clay, and mixtures of these, can be added to the phosphorescent phosphor pigment-containing polymer compositions in a concentration of about 0.001% to about 1% by weight, depending on the additive selected, to provide laser-markable phosphorescent plastic articles without interfering with the phosphorescence of the article. All weight percentages are herein expressed as the weight percentage of the additive in the final plastic part.

It has also been discovered that phosphorescent plastic articles comprising polymers that are known to readily absorb laser energy without the addition of a laser energy absorbing additive, such as polyvinyl chloride, polyethylene terephthalate, acrylonitrile butadiene styrene (ABS), and the like, are laser markable when they contain about 1% to about 50% by weight of a phosphorescent phosphor pigment.

It has further been discovered that the polymer compositions may optionally further contain about 0.001% to about 2% by weight of a whitening pigment, such as titanium dioxide, zinc sulfide, and the like, about 0.001% to about 20% by weight of an inert filler, such as calcium carbonate, talc, china clay, and the like, and other additives, such as about 0.1% to about 10% of a lubricating agent, without interfering with the phosphorescence of the resulting plastic articles. The concentrations of these pigments, fillers, and the like, are far less than the concentrations that are conventionally used to make plastic articles that are not phosphorescent. Contrary to conventional expectations, it has been further discovered that the addition of whitening pigments to thermoplastic and thermosetting compositions containing a phosphorescent phosphor pigment does not substantially reduce, and in some cases actually enhances, the phosphorescence of the plastic articles obtained.

It has also been discovered that phosphorescent indicia are produced when phosphorescent plastic articles further contain a "masking" pigment, such as carbon black or a color pigment, that decomposes, vaporizes or becomes colorless when exposed to laser energy to expose the underlying phosphorescent, thus producing a phosphorescent indicia against a dark or colored background. When masking pigments are used, the ratio of the phosphorescent phosphor pigment to the masking pigment is about 150:1 to about 1:1. A phosphorescent indicia may also be produced when a phosphorescent phosphor pigment-containing plastic article is coated with an opaque color pigment or dye (e. with a paint or ink) that decomposes, vaporizes or becomes colorless when exposed to laser energy to reveal the underlying phosphorescence.

When crystalline phosphorescent phosphors, such as those described in U.S. Pat. No. 5,424,006, are employed in polymer compositions, the laser marked plastic articles obtained have vastly improved luminescence in the dark and prolonged afterglow durations. When visible light absorbing, infrared light emitting phosphorescent phosphors, such as those described in U.S. Pat. No. 5,220,166, are employed in polymer compositions, the obtained plastic articles may be laser marked and the infrared emission read by a photodetector designed to detect light with wavelengths between 840 nm and 1100 nm. As described above, the indicia may be read as a contrast against the phosphorescent background, or indicia may be themselves phosphorescent against a masked background. Thus, the plastic articles may be laser marked with bar coding or other indicia that are read by photodetector devices.

It has also been discovered that both light and dark laser marks of varying shades and intensities can be obtained on phosphorescent plastic articles by varying and controlling laser parameters, such as amperage, pulse frequency, pulse duration, energy density, peak power, pulse energy, and the like. Thus, plastic articles with laser marked indicia having two or more preselected light or dark contrasting shades may be obtained to produce multi-colored designs visible in light environments.

Because phosphorescent phosphor pigments are produced by processes that can achieve temperatures of 700° C. to 1300° C. or more, plastic articles containing these pigments can be manufactured by any extrusion, molding or forming process without decomposition of the phosphor. Moreover, any type of laser including, but not limited to, Nd:YAG (Neodymium doped Yttrium Aluminum Garnet), $CO_2$ and excimer lasers may be used to mark the resulting phosphorescent phosphor pigment-containing plastic article.

The laser marked phosphorescent articles of the invention may be used for any application in which it is necessary for such indicia to be visible in dark or dimly lit environments, including, but not limited to, keypad characters on telephones, cellular telephones, pagers, and the like, computer keyboard characters, clocks including liquid-crystal clocks, emergency exit signs and other safety signage in buildings, hotels, aircraft, ships, and the like, safety directional signboards such as for fire extinguisher locations, signs inscribed with safety information that is necessary even during power outages, for instrument panels and controls of vehicles including motorcycles, and further including interior vehicle buttons having informational indicia, such as power window, door lock and mirror controls, heating and air conditioning controls, radio controls, windshield wiper/washer controls, and the like.

The laser marked phosphorescent plastics of the invention eliminate the bulkiness, weight, expense and maintenance costs of current battery or electrically powered lighting systems, and eliminate illumination problems associated with power outages.

DETAILED DESCRIPTION OF THE INVENTION

Figure 1A:
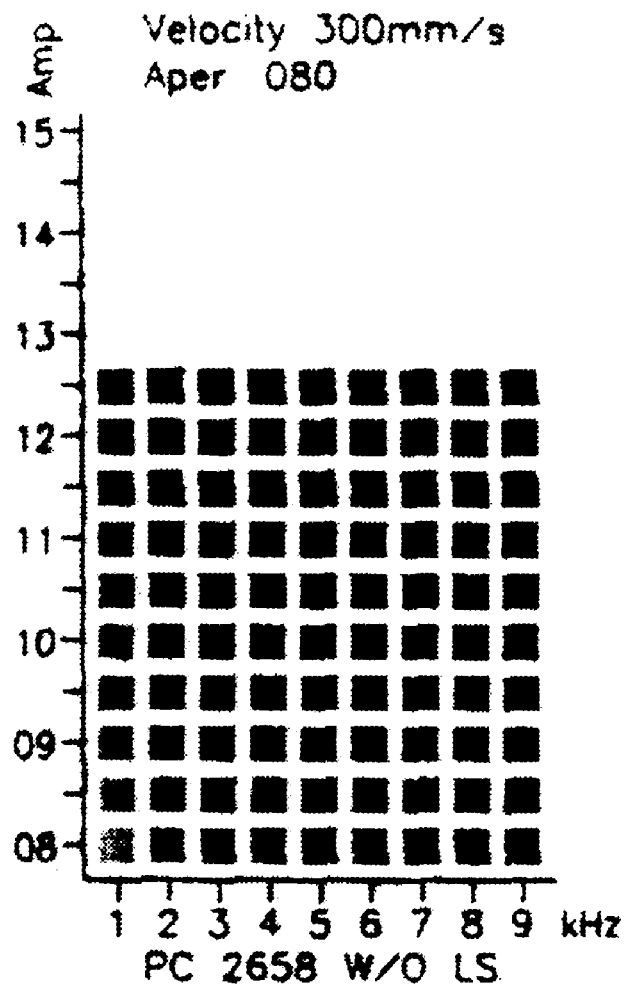
FIGS. 1A and 1B are photographs illustrating both light and dark laser marking of various shades and intensities produced on phosphorescent polycarbonate (PC) articles without (1A) and with (1B) the addition of a laser energy absorbing additive LS820, made with the formulation presented in Table 1.
Figure 1B:
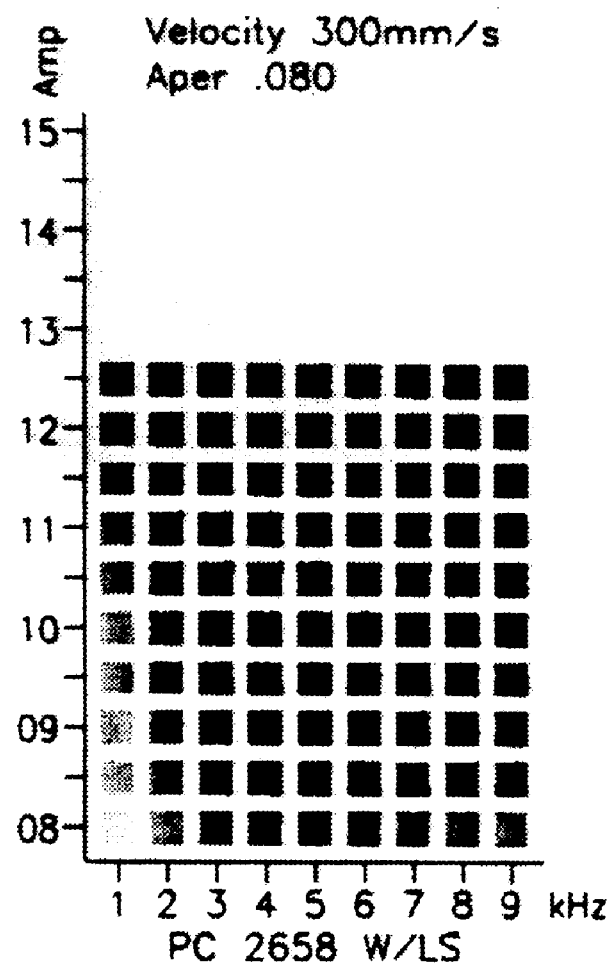

As used herein, the term "comprising" means that the listed components, ingredients or steps do not exclude other components, ingredients or steps known to one skilled in the technology that may be added for convenience or designed for certain end use applications, as long as these do not interfere with the absorption and emission of light from the phosphorescent phosphor pigment and the laser marking of the resulting plastic article. Accordingly, the term "comprising" encompasses the more restrictive terms "consisting essentially of" and "consisting of".

In one embodiment, the invention provides a molded, extruded or formed phosphorescent plastic article having a laser marked indicia thereon and having a composition that comprises (i) about 50% to about 99% by weight of a thermoplastic or thermosetting resin, (ii) about 1% to about 50% by weight of a phosphorescent phosphor pigment, and (iii) about 0.001% to about 1% by weight of a laser energy absorbing additive. The composition may optionally further contain zero to about 10% by weight of a lubricating agent, zero to about 2% by weight of a whitening pigment, and zero to about 20% by weight of an inert filler.

The thermoplastic or thermosetting resin may be any resin usable to produce plastic articles suitable for laser marking, including thermoplastic polyolefin resins, such as polyethylene, high density polyethylene and polypropylene that are well known to be transparent to laser energy from a Nd:YAG laser and require a laser energy absorbing additive. The usable resins further include polystyrene which requires a laser energy absorbing additive to produce a plastic article suitable for marking with a $CO_2$ laser. The addition of the laser energy absorbing additive in the described concentration does not diminish or interfere with the brightness of the luminescence or the duration of the afterglow in the resulting laser marked phosphorescent plastic article.

Polymer resins suitable for use in this embodiment of the invention include thermoplastic, thermosetting, addition and condensation polymers. Illustrative examples include, but are not limited to, polyesters, polystyrene, high impact polystyrene, styrene-butadiene copolymers, impact modified styrene-butadiene copolymer, poly-α-methyl styrene, styrene acrylonitrile copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polybutylene terephthalate, polyarylates, polyarylene sulfides, polyether ketones, polyethylene, high density polyethylene, polypropylene, and copolymers, grafts, blends, and mixtures thereof. The copolymers and blends of these polymers are well known to those skilled in the relevant technology, as are polymers which may serve as a backbone or a grafted polymer in graft polymers.

It is well known that there are polymers that readily absorb laser energy from lasers, such as Nd:YAG, $CO_2$ or excimer lasers, without the addition of laser energy absorbing additives. Illustrative examples of such laser energy absorbing polymers are polyvinyl chloride, polyethylene terephthalate, ABS, and the like. Thus, in another embodiment, the invention provides a molded, extruded or formed phosphorescent plastic article having a laser marked indicia thereon and having a composition that comprises (i) about 50% to about 99% by weight of a thermoplastic or a thermosetting resin that absorbs laser energy, and (ii) about 1% to about 50% by weight of a phosphorescent phosphor pigment. This composition may optionally further contain zero to about 10% by weight of a lubricating agent, zero to about 2% by weight of a whitening pigment, and zero to about 20% by weight of an inert filler, as well as other additives described below that do not interfere with the absorption and emission of light from the phosphorescent phosphor pigment and the laser marking of the resulting plastic article. Useful polymers that readily absorb laser energy without the addition of a laser energy absorbing additive are known to those skilled in the relevant technology and are suitable for use in this embodiment of the invention. Such polymers include, but are not limited to, addition and condensation polymers selected from polyesters, polystyrene, high impact polystyrene, styrene-butadiene copolymers, impact modified styrene-butadiene copolymer, poly-α-methyl styrene, styrene acrylonitrile copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polybutylene terephthalate, polyarylates, polyarylene sulfides, polyether ketones, and, copolymers, grafts, blends and mixtures thereof.

Any type of laser that may be used in marking plastic articles may be used to mark the phosphorescent plastic articles including, but not limited to, Nd:YAG lasers having principal wavelength of 1,064 nm or 532 nm (frequency doubled), solid state pulsed lasers, pulsed metal vapor lasers, excimer lasers, TEA-$CO_2$ lasers, continuous wave (CW) $CO_2$ lasers, ruby lasers, diode lasers, and the like, with Nd:YAG, TEA-$Co_2$ and excimer lasers being preferred.

Phosphorescent phosphors suitable for use in the invention include any phosphorescent phosphor pigment that is insoluble in the resin, including conventional sulfide phosphorescent phosphors. The manufacture of phosphorescent phosphor pigments is well known and involves heating the components to temperatures of about 700° C. to 1300° C. or higher, cooling the obtained compound and pulverizing and/or sieving (e. to 100 mesh) the compound to obtain a powder having a given particle size. The phosphorescent phosphor pigments are usually colored powders, such as yellowish-green, greenish-blue, orangish-yellow powders, which themselves may impart a degree of color to translucent, transparent or opaque plastic articles.

For applications requiring brighter luminescence and longer afterglow durations than provided by conventional sulfide phosphors, phosphorescent phosphor pigments, such as those described in U.S. Pat. No. 5,424,006, the disclosure of which is hereby incorporated by reference, are preferred. These described phosphorescent phosphor pigments, which absorb visible or ultraviolet light and emit light in the visible spectrum, are manufactured by Nemoto & Company, Tokyo and are obtainable from United Mineral & Chemical Corporation, Lyndhurst, N.J. under the brand name LUMI-NOVA®. These phosphors are chemically stable metal oxides having a crystalline (spinel, monoclinic) structure and particle sizes ranging from about 7 μm to greater than 250 μm. They contain elements that include strontium (Sr), aluminum (Al), calcium (Ca), barium (Ba), magnesium (Mg), europium (Eu), lanthanum (La), cerium (Ce), praseodymium (Pr), neodymium (Nd), samarium (Sm), gadolinium (Gd), dysprosium (Dy), holmium (Ho), erbium (Er), terbium (Tb), thulium (Th), ytterbium (Yb), lutetium (Lu), tin (Sn) and bismuth (Bi). The chemical compositions of exemplary phosphors suitable for use in the invention include $SrAl_2O_4$:Eu or $SrAl_2O_4$:Eu, Dy or $SrAl_2O_4$:Eu, Nd that emit green light, and CaSrS:Bi, CaSrS:Bi, Nd, $CaAl_2O_4$:Eu, plus Nd, Sm, Dy, Tm, Ce, Pr, Gd, Tb, Ho, Er, Yb, Lu, Mn, Sn, or Bi, that emit blue light, or $BaAl_2O_4$:Eu, Nd, $BaAl_2O_4$Eu, Sm, and the like, that emit green light.

LUMINOVA® Green phosphorescent phosphor pigments demonstrate an afterglow duration, after excitation with a standard light source at 400 lux for 20 minutes at room temperature, of about 1500 minutes to 2500 minutes (25 to 42 hours) or, after excitation with a standard light source at 200 lux for 4 minutes, of about 700 minutes to 1000 minutes (12 to 17 hours). For example, LUMINOVA® Green (G-300M) comprising Strontium Aluminate Oxide:Dysprosium, Europium has a specific gravity of about 3.6, a particle size of 20±5 μm to greater than 100 μm and absorbs light in the ultraviolet spectrum (about 320 to about 382 nm). This pigment emits green light at a peak wave length of about 521 nm with an afterglow duration of greater than 2000 minutes (33 hours) after excitation with a standard light source at 400 lux for 20 minutes at room temperature.

Other suitable phosphorescent phosphor pigments for use in the invention are manufactured by Chemitech, Inc., Tokyo and available from F.W. Bass International, Inc., Moon Township, Penna. under the brand name PICARIKO®. For example, PICARIKO® CP-05 is a phosphorescent phosphor pigment manufactured from a mixture of aluminum oxide, strontium oxide, calcium oxide, europium oxide, and boron oxide. This phosphor pigment has a crystalline (triclinic) structure and has a melting point of greater than 1500° C., a particle size that passes through 200 mesh and a specific gravity of about 3.6. It is a yellowish green powder that absorbs light in the ultraviolet spectrum (200–450 nm) and emits a green light having an emission peak of 520 nm with an afterglow duration of greater than 20 hours.

Other phosphorescent phosphor pigments available as LUMINOVA® or PICARIKO® emit visible blue, orange, yellowish green light, and the like.

Another phosphorescent phosphor pigment suitable for use in the invention is described in U.S. Pat. No. 5,220,166, the disclosure of which is hereby incorporated by reference. This pigment is a phosphate, molybdate or aluminate compound activated by neodymium and ytterbium ions. Examples of these phosphorescent phosphor pigments include Li(Nd,Yb) $P_4O_{12}$; $Ca_{10}(PO_4)6F_2$:Nd,Yb; $Ca_8La_2$ $(PO_4)6O_2$:Nd,Yb; and the like. These phosphors are excited by visible light, having peaks near 525 nm, 585 nm, 630 nm, 685 nm, 745 nm, and near 800 nm and emit light in the infrared range, with a peak near 980 nm. The infrared emitted light may be read, for example, by a photodetector designed to detect light with wave lengths between 840 nm and 1100 nm. Thus, phosphorescent plastic articles having polymer compositions according to the invention that comprise these phosphorescent phosphor pigments are suitable for laser inscription of indicia which can be read directly by photodetector devices, such as bar code readers, and the like. The indicia may be read by contrast against a phosphorescent plastic background or, if the indicia themselves are phosphorescent, they may be read directly.

The selected concentration of the phosphorescent phosphor pigment in the polymeric composition depends upon the degree of luminescence and duration of afterglow desired. In general, the higher the concentration of the phosphorescent phosphor pigment, the brighter is the luminescence and the longer is the afterglow duration. It has been found that as little as 1% by weight of a phosphorescent phosphor pigment such as LUMINOVA® or PICARIKO® provides visible luminescence, whereas 30% or more of a conventional sulfide-based phosphor may be required to produce the same amount of luminescence. Because phosphorescent phosphor pigments such as LUMINOVA® and PICARIKO® are relatively expensive, a balance between the desired luminescence and afterglow duration versus the expense of the article may dictate a smaller concentration than 50% by weight, such as about 5% to about 20% by weight, preferably about 5% to about 10% by weight, and more preferably about 5% by weight.

It has been discovered that laser energy absorbing fillers, such as mica, carbon black, titanium dioxide, china clay, barium sulfate, talc, and the like, whitening pigments, such as titanium dioxide, zinc sulfide, zinc phosphate, lithopone, zinc oxide, barium sulfate, and the like, inert fillers, such as barium sulfate, calcium carbonate, talc, china clay, and the like, and mixtures of any of the foregoing, may be added to the polymer composition in concentrations of about 0.001% to about 50% by weight, depending on the type of filler, without substantially interfering with the luminescence of the phosphor. Surprisingly, a whitening pigment, such as titanium dioxide in small amounts (about 0.001% to about 0.1%), has been found to be light reflecting and, rather than interfering with the luminescence, actually enhances it.

Any laser energy absorbing additive known to those skilled in the art of laser marking may be used in the polymer compositions of the invention in an appropriate concentration. Preferably, the laser energy absorbing additive is selected from the group consisting essentially of about 0.001% to about 1% by weight of a mica-based laser energy absorbing additive, about 0.001% to about 0.1% by weight carbon black, about 0.001% to about 0.1% by weight titanium dioxide, about 0.01% to about 1% by weight barium sulfate, about 5% to about 20% by weight talc, about 5% to about 20% china clay, and mixtures thereof.

More preferably the laser energy absorbing additive is selected from the group consisting essentially of about 0.15% to about 0.5% by weight, especially 0.5% by weight, of the mica-based laser energy absorbing additive, about 0.001% to about 0.03% by weight carbon black, about 0.005% to about 0.05% by weight, especially 0.025% by weight titanium dioxide, about 0.05% to about 0.5% by weight, especially 0.25% by weight barium sulfate, about 5% to about 15% by weight talc, about 5% to about 15% china clay, and mixtures thereof.

When mica is used as a laser energy absorbing filler, it is preferably in flake, platelet or pearl form, preferably having a particle size of less than 15 μm for use with Nd:YAG lasers. Suitable mica-based additives, available from EM Industries, Hawthorne, N.Y., for use with Nd:YAG lasers include IRIODIN®/LAZER FLAIR® LS 820 and LS 825. Mica-based additives suitable for use with TEA-$CO_2$ lasers include IRIODIN®/LAZER FLAIR® LS 800, LS 805 and LS 810, having a particle size ranging from less than 15 μm to 110 μm.

The polymer compositions may further comprise about 0.001% to about 2% of a whitening pigment, such as those described above. Preferably, the whitening pigment is selected from the group consisting essentially of about 0.001% to about 0.1% by weight titanium dioxide, about 0.005% to about 0.03% by weight zinc sulfide, about 0.005% to about 0.03% by weight zinc phosphate, about 0.005% to about 0.03% by weight lithopone, about 0.005% to about 0.03% by weight zinc oxide, about 0.005% to about 0.03% by weight barium sulfate, and mixtures thereof.

The polymer composition may further comprise about 0.001% to about 20% by weight of an inert filler, as known to those skilled in the art of polymer compounding. Preferably, the inert filler is selected from the group consisting of calcium carbonate, talc, china clay, and mixtures thereof.

In order to aid in dispersing the phosphorescent phosphor pigment and other additives in the polymer composition during the compounding process, the composition may further comprise about 0.1% to about 10% of a lubricating agent. Suitable dispersing/lubricating agents known to those skilled in the art comprise low molecular weight substantially transparent polymeric materials, such as silicone waxes, fatty acids, metallic salts, ionomer waxes, amide waxes, hydroxy stearates, olefinic waxes, metallic stearates, complex esters, polyethylene waxes, polypropylene waxes, and mixtures thereof. An exemplary suitable lubricating agent is ADVAWAX® 280, obtainable from Morton Thiokol, Inc., Cincinnati, Ohio, with the chemical name N,N' ethylene bis(stearamide).

In addition to the resins, laser energy absorbing additives, whitening pigments, inert fillers and lubricating additives described above, the polymer composition may comprise other additives provided the additives do not interfere with the absorption and emission of light from the phosphorescent phosphor pigment and the laser marking of the resulting plastic article. Such other additives are known to those skilled in the art of polymer compounding and include, but are not limited to, reinforcing fillers, flame retardants, antioxidants, impact modifiers, plasticizers, and the like.

Examples of polymer compositions suitable for producing laser marked molded, extruded or formed phosphorescent plastic articles are illustrated in Table 1. The phosphorescence of the article, the quality of the laser mark and the contrast of the laser mark against the background were visually graded on a scale of 1 to 5, with 5 being the highest and 1 the lowest. The laser marks were made on molded articles with a Nd:YAG laser having a wavelength of 1064 nm, with operating parameters of 11 amps, 5 KHz frequency, and a velocity of 20 feet per minute. As illustrated in the Table, K-resin, high impact polystyrene (HIPS), general purpose polystyrene (GPS), polycarbonate, styrene acrylonitrile copolymer, polyethylene terephthalate and ABS are laser markable with a good quality, high contrast mark with or without the addition of a laser energy absorbing additive such as a mica-based additive LS820. However, a laser energy transparent polymer, such as high density polyethylene (HDPE) requires the addition of a laser energy absorbing additive to produce a high quality, good contrast laser mark.

As further illustrated in Table 1, the addition of the laser energy absorbing additive does not interfere with the glow effect (phosphorescence) of the phosphorescent plastic articles. Moreover, when a laser absorbing polymer such as polycarbonate is employed, a relatively low amount of a laser absorbing additive noticeably and significantly enhances the quality of the laser mark. This result is unexpected. One skilled in the art would not usually add a laser energy absorbing additive to a laser absorbing polymer such as PC in order to achieve a good quality mark. Because of this surprising discovery that the mark quality is enhanced by the addition of a minor amount of the additive, the total laser energy required to achieve a mark of excellent contrast may now be reduced. Such a lower laser energy level will result in a faster processing speed, a longer lifetime for laser equipment and, importantly, less damage to the plastic surface so that the marking quality is drastically improved.

The phosphorescent plastic articles suitable for laser marking include any plastic articles that are molded, extruded or formed by any known conventional method. In one embodiment of the invention, a method for producing a laser marked indicia on a molded, extruded or formed phosphorescent plastic article, comprises the steps of compounding a polymeric composition that comprises (i) about 50% to about 99% by weight of a thermoplastic or a thermosetting resin, (ii) about 1% to about 50% by weight of a phosphorescent phosphor pigment, and (iii) about 0.001% to about 1% by weight of a laser energy absorbing additive; molding, extruding or forming the compounded composition to form a phosphorescent plastic article; and exposing a portion of the plastic article to laser energy from a laser to inscribe an indicia thereon.

In another embodiment of the invention, when the resin is itself laser energy absorbing, the method for producing a laser marked indicia on a molded, extruded or formed phosphorescent plastic article comprises the steps of compounding a polymeric composition that comprises (i) about 50% to about 99% by weight of a thermoplastic or a thermosetting resin that absorbs laser energy, and (ii) about 1% to about 50% by weight of a phosphorescent phosphor pigment; molding, extruding or forming the compounded composition to form a phosphorescent plastic article; and exposing a portion of the plastic article to laser energy from a laser to inscribe an indicia thereon. In each of the above embodiments, the composition preferably further comprises about 0.1% to about 10% of a lubricating agent.

In the embodiments of the invention, phosphorescent plastic articles containing phosphorescent phosphor pigments that emit light in the visible wavelength range can be laser marked to provide permanent indicia that are visible with high contrast in light environments and are also visible in the dark with high contrast against a phosphorescent plastic background. Alternatively, the laser marked indicia themselves are phosphorescent against a dark or colored plastic background. In this embodiment of the invention, the plastic article containing the phosphorescent phosphor pigment in a concentration described above, further comprises a color pigment or carbon black, that decomposes, vaporizes, or becomes colorless when exposed to laser energy. The color pigment or carbon black is present in a concentration sufficient to mask the phosphorescence of the background of the plastic article in the dark. The ratio of the phosphorescent phosphor pigment to the color pigment or carbon black is preferably about 150:1 to about 1:1. When the indicia is laser marked on the masked background of the plastic article, the underlying phosphorescence is exposed, resulting in a phosphorescent indicia. The indicia may or may not be visible in a light environment. However, it is preferable that the laser marked indicia be visible either as a light or a dark mark against the masked background in the light.

In another embodiment, the plastic article containing the phosphorescent phosphor pigment is masked by coating with a masking paint or ink that decomposes, vaporizes or becomes colorless in the presence of laser energy. When an indicia is laser marked on the article, the coating is destroyed and the underlying phosphorescence is revealed to form a phosphorescent indicia. Such a laser marking would also be visible in the light as a light mark resulting from the revealing of the underlying plastic composition.

It may be desirable to produce laser marks with the highest visual contrast between the mark and the color of the surrounding plastic. However, it is known that by varying laser parameters, such as amperage, pulse frequency and pulse duration in the case of Nd:YAG lasers, and such as energy density, peak power and pulse energy in the case of TEA-$CO_2$ lasers, for example, laser marks of varying shades and intensities may be obtained. For example, Nd:YAG lasers may have an amperage range of about 7 to about 20 amps, a pulse frequency range of 1 to about 20 kilohertz (KHz), and a scanning velocity of about 150 to about 600 millimeters per second. A method for obtaining both light and dark laser marks of varying shades and intensities on a single plastic article by selectively controlling laser energy parameters, is disclosed in our co-pending and co-assigned U.S. Pat. No. Application, Ser. No. 08/874,401, entitled "Controlled Color Laser Marking of Plastics", filed Jun. 13, 1997, the disclosure of which is hereby incorporated by reference. The method may be used to obtain similar laser marks on phosphorescent plastic articles comprising the polymer compositions of the present invention to obtain laser designs that appear as multi-colored designs in the light and that are visible in contrast against the phosphorescent plastic background in darkened environments.

To obtain both light and dark laser marks on a phosphorescent plastic article, the resin employed is a thermoplastic resin that foams when heated by laser energy. Light marks are produced at certain selected laser settings by foaming of the resin and dark marks are produced at other selected laser settings by charring of at least the resin. There may also be a certain degree of charring of additives present in the composition. In this embodiment, the method for obtaining. both light and dark laser marks on a phosphorescent plastic article comprises the steps of providing a plastic article suitable for laser marking and having a composition comprising (i) about 50% to about 99% by weight of a thermoplastic resin that foams when heated, (ii) about 1% to about 50% by weight of a phosphorescent phosphor pigment, and (iii) about 0.001% to about 1% by weight of a laser energy absorbing additive and, preferably, about 0.01% to about 10% by weight of a lubricating agent; providing a laser having a principal wave length, a preselectable beam aperture and scanning velocity, and at least two variable laser parameters selectable from the group consisting essentially of an amperage from a range of amperages, a pulse frequency from a range of pulse frequencies, a pulse duration from a range of pulse durations, an energy density from a range of energy densities, a peak power from a range of peak powers, and a pulse energy from a range of pulse energies, wherein each individual selection of two or more parameters comprises a laser setting that provides a laser beam having an individual laser energy characteristic; selecting a first laser setting comprising a selection of at least two parameters to provide a first laser beam having an energy characteristic which causes the resin to foam; irradiating a first portion of the phosphorescent plastic article with the first laser beam to produce a laser mark having a light shade; selecting a second laser setting different than the first laser setting and comprising a selection of at least two parameters to provide to provide a second laser beam having an energy characteristic which causes at least the resin to carbonize; and irradiating a second portion of the plastic article with the second laser beam to produce a laser mark having a darker shade than the light shade.

The method may further comprise the steps of (a) selecting a third laser setting different than the first and second laser settings and comprising a third selection of at least two parameters to provide a third laser beam having an energy characteristic which causes the resin to foam or at least the resin to carbonize; (b) irradiating a third portion of the phosphorescent plastic article with the third laser beam to produce another laser mark having a different light shade or a different dark shade on the plastic article; and (c) repeating steps (a) and (b) a desired number of times to produce a plurality of different shades of light and dark laser marks on the phosphorescent plastic article.

The method may also produce light and dark laser marks on a phosphorescent plastic article that comprises a resin that is itself laser markable without the addition of a laser energy absorbing additive.

Figure 2A:
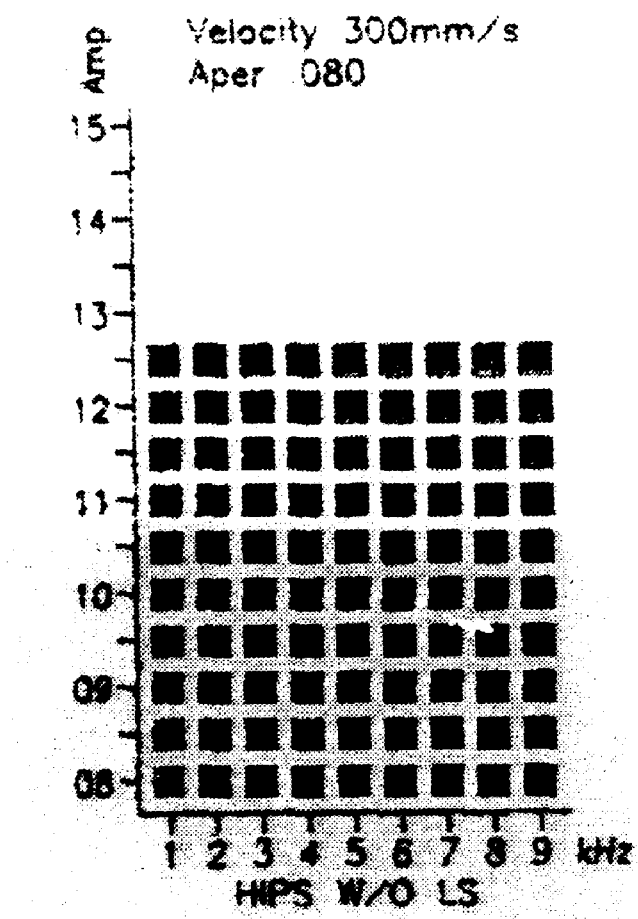
FIGS. 2A and 2B are photographs illustrating both light and dark laser marking of various shades and intensities produced on phosphorescent high impact polystyrene (HIPS) articles without (2A) and with (2B) the addition of a laser energy absorbing additive LS820, made with the formulation presented in Table 1.
Figure 2B:
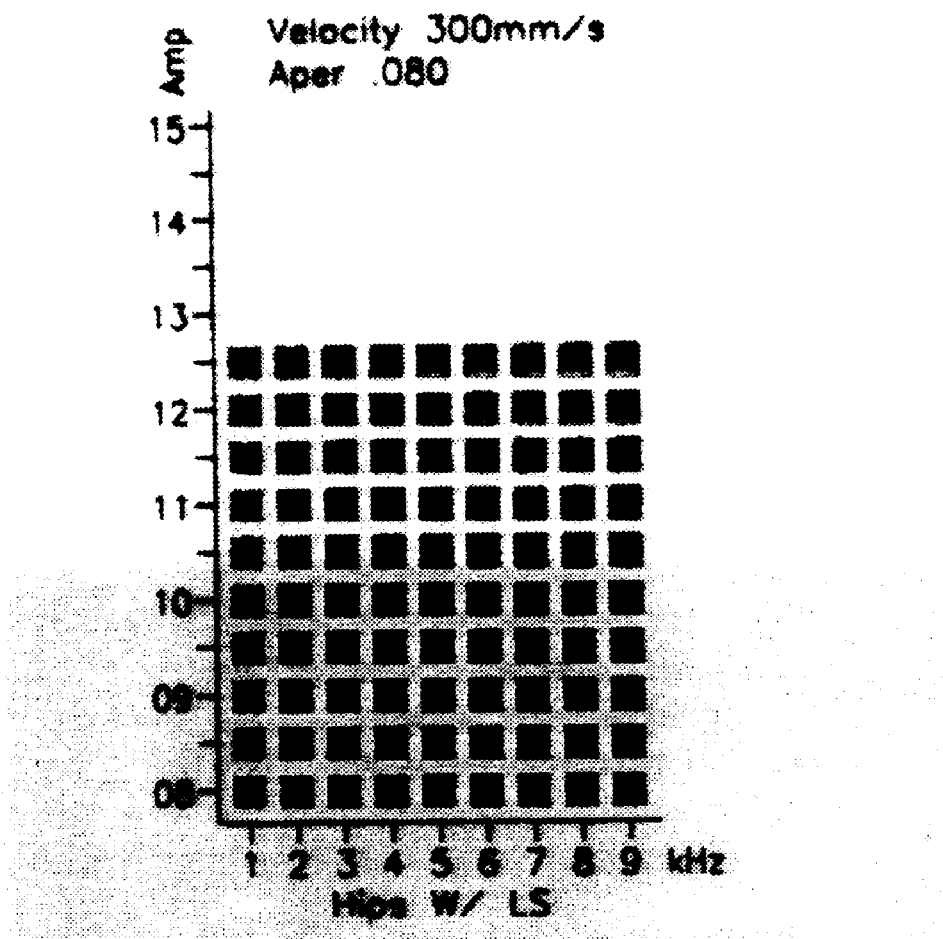
Figure 3:
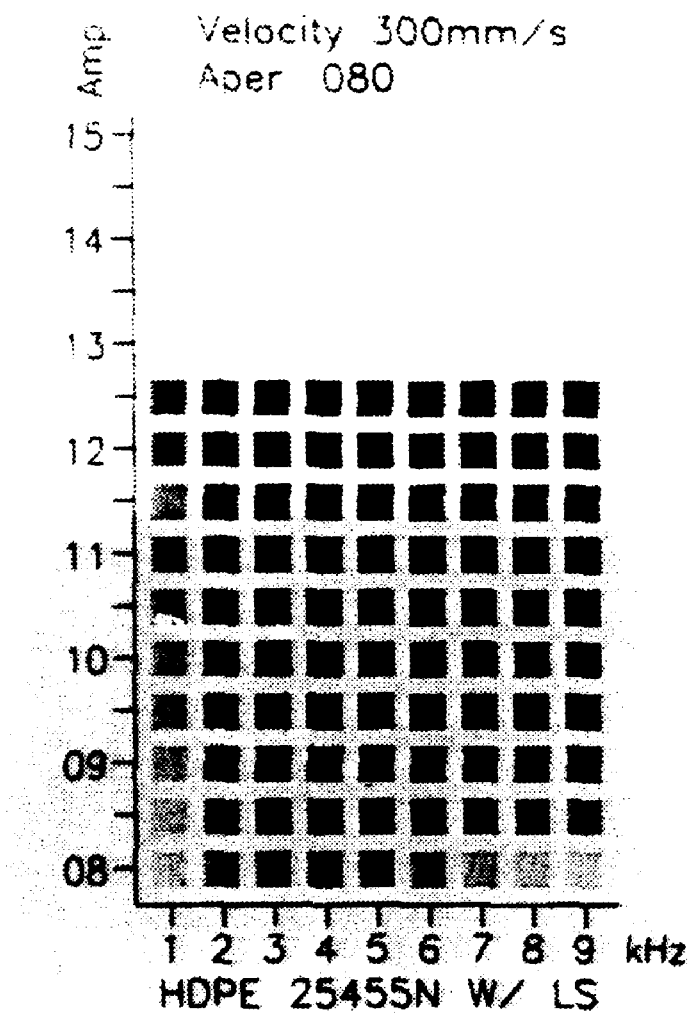
FIG. 3 is a photograph illustrating both light and dark laser marking of various shades and intensities produced on a phosphorescent high density polyethylene (HDPE) article with the addition of a laser energy absorbing additive LS820, according to the formulation presented in Table 1.

Examples of molded phosphorescent plastic articles having both light and dark markings of various shades and intensities according to selected Nd:YAG laser parameters of amperage and pulse frequencies are illustrated in FIGS. 1A, 1B, 2A, 2B, and 3. The exemplary phosphorescent polycarbonate (PC)(FIG. 1), high impact polystyrene (HIPS) (FIG. 2)and high density polyethylene (HDPE) plastic articles were made from the compositions illustrated in Table 1. The examples illustrate that light laser marks can be produced at low amperage and low pulse frequencies and dark laser marks can be obtained at higher amperages and pulse frequencies. Polycarbonate is a thermoplastic resin that foams when heated and the foaming effect is enhanced by the use of a laser energy absorbing additive, such as LS820. FIG. 1A illustrates laser marking of a phosphorescent PC article without LS820, and FIG. 1B the laser marking of a phosphorescent PC article containing LS820. Similarly, FIG. 2A illustrates laser marking of a phosphorescent HIPS article without (w/o) LS820 and FIG. 2B the laser marking of a phosphorescent HIPS article containing LS820. FIG. 3 illustrates laser marking of a phosphorescent HDPE article containing LS 820. HDPE, which is transparent to laser energy, requires a laser energy absorbing additive for laser marking.

Figure 4:
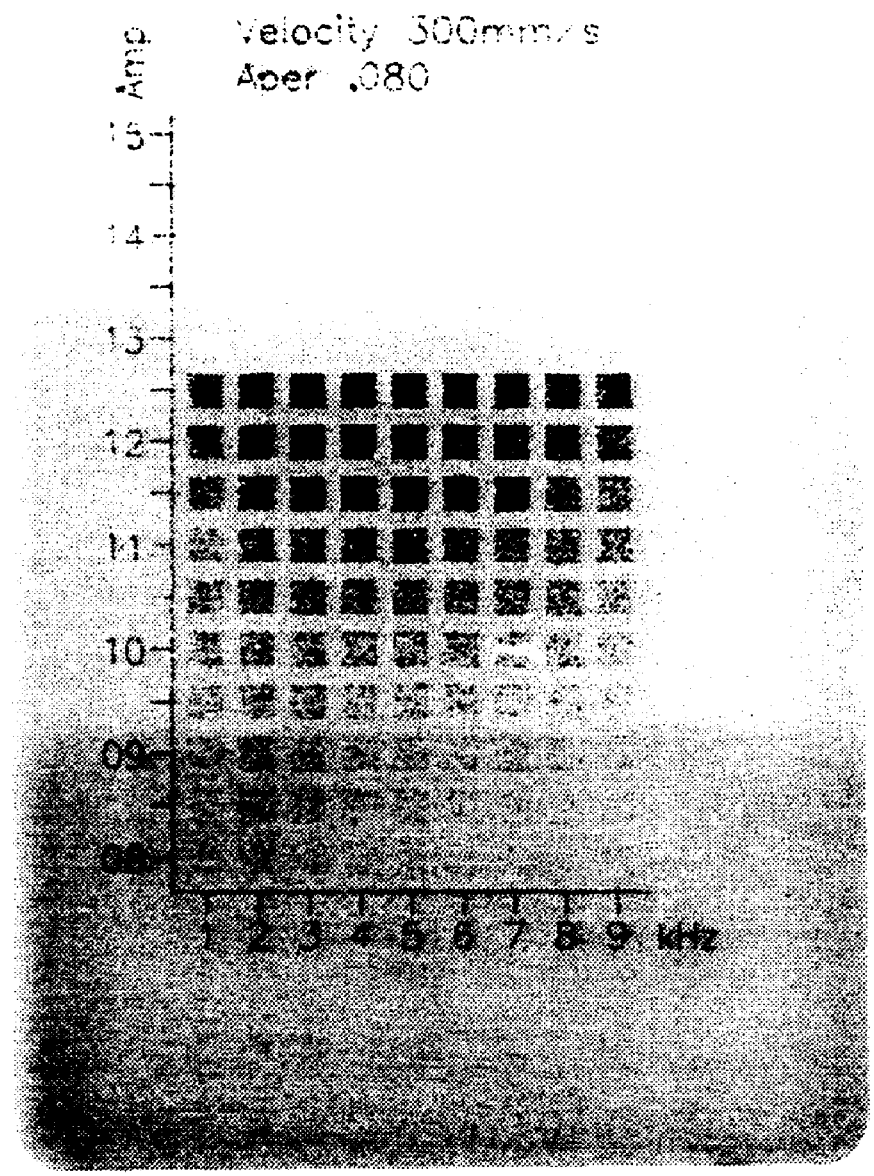
FIG. 4 is a photograph illustrating both light and dark laser markings of various shades and intensities produced on a phosphorescent HIPS article containing 0.03% zinc sulfide as a whitening agent.
Figure 5:
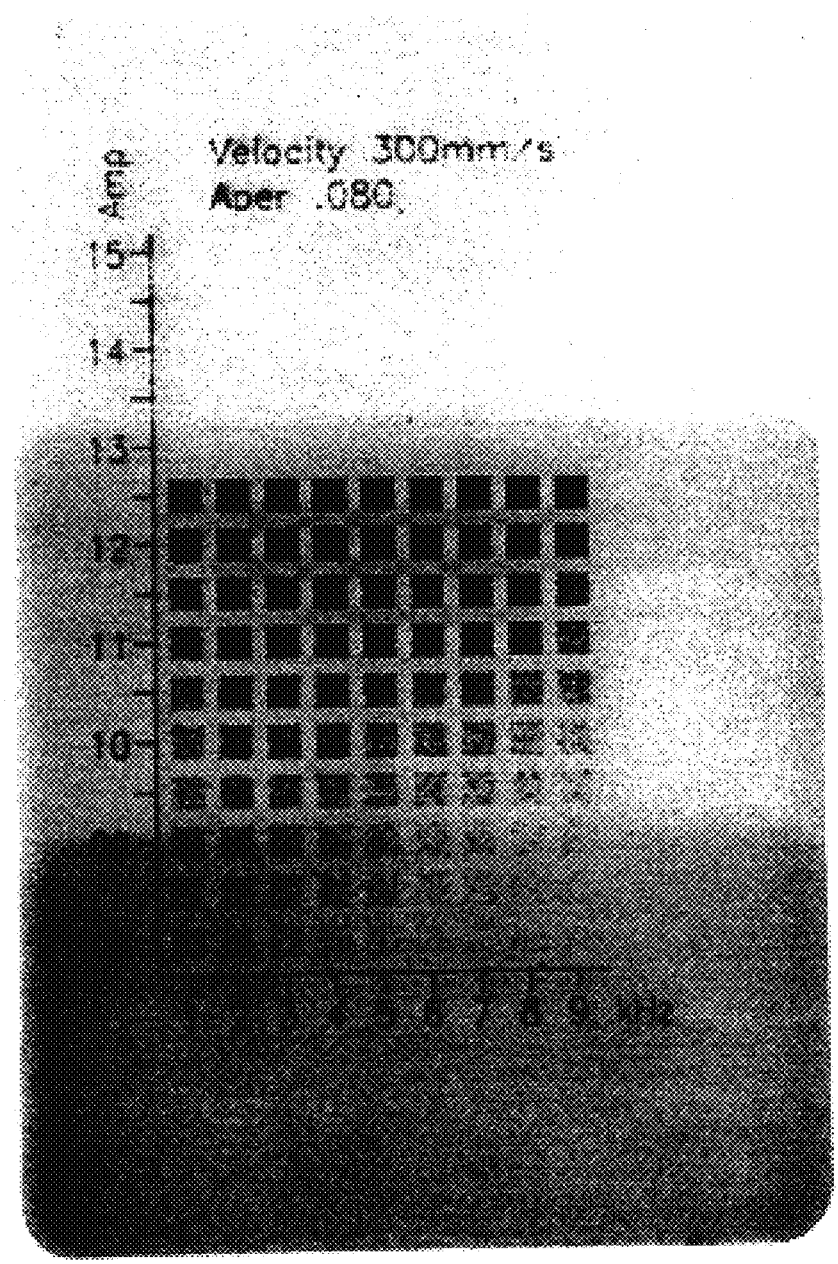
FIG. 5 is a photograph illustrating both light and dark laser markings of various shades and intensities produced on a phosphorescent HIPS article containing 0.01% titanium dioxide as a whitening agent.

Laser marked phosphorescent HDPE articles containing a whitening agent, 0.03% zinc sulfide or 0.01% titanium dioxide respectively, are illustrated in FIGS. 4 and 5, respectively. The presence of a whitening agent such as zinc sulfide or titanium dioxide in the concentrations employed in the invention compositions does not diminish the phosphorescence of the articles.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Resin* | K-resin | K-resin | GPS | GPS | HIPS | HIPS | PET | SAN | SAN | PC | PC | HDPE | ABS | ABS |
| % LS820** | 0 | 0.15 | 0 | 0.15 | 0 | 0.15 | 0 | 0 | 0.3 | 0 | 0.3 | 0.5 | 0 | 0.3 |
| % A280*** | 0.5 | 0.5 | 0.5 | 0.5 | 0.5 | 0.5 | 0.5 | 0.5 | 0.5 | 0.5 | 0.5 | 0.5 | 0.5 | 0.5 |
| % Luminova ® | 5.0 | 5.0 | 5.0 | 5.0 | 5.0 | 5.0 | 5.0 | 5.0 | 5.0 | 5.0 | 5.0 | 5.0 | 5.0 | 5.0 |
| Glow effect | 3 | 4 | 3 | 4 | 5 | 5 | 2 | 3 | 3 | 3 | 4 | 3 | 5 | 5 |
| Mark quality | 3 | 4 | 3 | 4 | 5 | 5 | 2 | 3 | 3 | 3 | 4 | 3 | 5 | 5 |
| Contrast | 4 | 4 | 4 | 4 | 5 | 5 | 3 | 3 | 4 | 3 | 4 | 4 | 4 | 3 |

*K-resin = impact modified styrene-butadiene copolymer
GPS = general purpose styrene
HIPS = high impact polystyrene
PET = polyethylene terephthalate
SAN = stryrene acrylonitrile copolymer
PC = polycarbonate
HDPE = high density polyethylene
ABS = acrylonitrile butadiene styrene
**Iriodin/Lazer Flair Additive (mica based)
***Advawax lubricating agent

What is claimed is:

1. A method for producing a laser marked indicia on a molded, extruded or formed phosphorescent plastic article, comprising the steps of:
compounding a polymeric composition that comprises (i) about 50% to about 99% by weight of a thermoplastic or a thermosetting resin, (ii) about 1% to about 50% by weight of a phosphorescent phosphor pigment, (iii) about 0.001% to about 20% by weight of a laser energy absorbing additive, and optionally zero to about 10% by weight of a lubricating agent, zero to about 2% by weight of a whitening pigment and zero to about 20% by weight of an inert filler;
molding, extruding or forming the compounded composition to form a phosphorescent plastic article; and
exposing a portion of the plastic article to laser energy from a laser to inscribe an indicia thereon.

2. The method of claim 1, wherein the laser is selected from the group consisting of a Nd:YAG laser, a solid state pulsed laser, a pulsed metal vapor laser, an excimer laser, a $CO_2$ laser, a ruby laser, and a diode laser.

3. The method of claim 2, wherein the laser is a Nd:YAG laser, a $CO_2$ laser or an excimer laser.

4. The method of claim 1, further comprising the step of coating the plastic article prior to the laser energy exposure step with a coating sufficient to mask the phosphorescence of the phosphor pigment, wherein the coating comprises a pigment that decomposes, vaporizes or becomes colorless when exposed to laser energy, and the laser energy exposure step further comprises producing a phosphorescent indicia on the plastic article.

5. The method of claim 1, wherein the laser energy absorbing additive is selected from the group consisting of about 0.001% to about 1% by weight of a mica-based laser energy absorbing additive, about 0.001% to about 0.1% by weight carbon black, about 0.001% to about 0.1% by weight titanium dioxide, about 0.01% to about 1% by weight barium sulfate, about 0.005% to about 0.03% by weight zinc sulfide, about 5% to about 10% by weight calcium carbonate, about 5% to about 20% by weight talc, about 5% to about 20% china clay, and mixtures thereof.

6. The method of claim 1, wherein the resin is and addition or condensation polymer selected from the group consisting of polyesters, polystyrene, high impact polystyrene, styrene-butadiene copolymers, impact modified styrene-butadiene copolymer, poly-α-methyl styrene, styrene acrylonitrile copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polybutylene terephthalate, polyarylates, polyarylene sulfides, polyether ketones, polyethylene, high density polyethylene, polypropylene, and copolymers, grafts, blends, and mixtures thereof.

7. A method for producing a laser marked indicia on a molded, extruded or formed phosphorescent plastic article, comprising the steps of:
compounding a polymeric composition that comprises (i) about 50% to about 99% by weight of a thermoplastic or a thermosetting resin, (ii) about 1% to about 50% by weight of a phosphorescent phosphor pigment, and optionally zero to about 10% by weight of a lubricating agent, zero to about 2% by weight of a whitening pigment and zero to about 20% by weight of an inert filler;
molding, extruding or forming the compounded composition to form a phosphorescent plastic article; and
exposing a portion of the plastic article to laser energy from a laser to inscribe an indicia thereon.

8. The method of claim 7, wherein the laser is selected from the group consisting of a Nd:YAG laser, a solid state pulsed laser, a pulsed metal vapor laser, an excimer laser, a $CO_2$ laser, a ruby laser, and a diode laser.

9. The method of claim 8, wherein the laser is a Nd:YAG laser, a $CO_2$ laser or an excimer laser.

10. The method of claim 7, further comprising the step of coating the plastic article prior to the laser energy exposure step with a coating sufficient to mask the phosphorescence of the phosphor pigment, wherein the coating comprises a pigment that decomposes, vaporizes or becomes colorless when exposed to laser energy, and the laser energy exposure step further comprises producing a phosphorescent indicia on the plastic article.

11. The method of claim 7, wherein the resin is an addition or condensation polymer selected from the group consisting of polyesters, polystyrene, high impact polystyrene, styrene-butadiene copolymers, impact modified styrene-butadiene copolymer, poly-α-methyl styrene, styrene acrylonitrile copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polybutylene terephthalate, polyarylates, polyarylene sulfides, polyether ketones, and copolymers, grafts, blends, and mixtures thereof.

12. A method for obtaining a phosphorescent laser marked indicia on a molded, extruded or formed plastic article, comprising the steps of:

compounding a polymeric composition that comprises (i) about 50% to about 99% by weight of a thermoplastic or a thermosetting resin, (ii) about 1% to about 50% by weight of a phosphorescent phosphor pigment, (iii) about 0.001% to about 20% by weight of a laser energy absorbing additive, and (iv) a color pigment that masks the phosphorescence of the phosphor pigment, wherein the color pigment decomposes, vaporizes or becomes colorless in the presence of laser energy, and wherein the ratio of the phosphorescent phosphor pigment to the color pigment is about 150:1 to about 1:1, and optionally zero to about 10% by weight of a lubricating agent, zero to about 2% by weight of a whitening pigment and zero to about 20% by weight of an inert filler;

molding, extruding or forming the compounded composition to form a phosphorescent plastic article;

exposing a portion of the plastic article to laser energy from a laser to inscribe a phosphorescent indicia thereon.

13. The method of claim 12, wherein the color pigment is carbon black.

14. A method for obtaining both light and dark laser marks on a phosphorescent plastic article, comprising the steps of:

providing a plastic article suitable for laser marking and having a composition comprising (i) about 50% to about 99% by weight of a thermoplastic resin that foams when heated, (ii) about 1% to about 50% by weight of a phosphorescent phosphor pigment, (iii) about 0.001% to about 20% by weight of a laser energy absorbing additive, and optionally zero to about 10% by weight of a lubricating agent, zero to about 2% by weight of a whitening pigment and zero to about 20% by weight of an inert filler;

providing a laser having a principal wave length, a preselectable beam aperture and scanning velocity, and at least two variable laser parameters selectable from the group consisting essentially of an amperage from a range of amperages, a pulse frequency from a range of pulse frequencies, a pulse duration from a range of pulse durations, an energy density from a range of energy densities, a peak power from a range of peak powers, and a pulse energy from a range of pulse energies, wherein each individual selection of two or more parameters comprises a laser setting that provides a laser beam having an individual laser energy characteristic;

selecting a first laser setting comprising a selection of at least two parameters to provide a first laser beam having an energy characteristic which causes the resin to foam;

irradiating a first portion of the phosphorescent plastic article with the first laser beam to produce a laser mark having a light shade;

selecting a second laser setting different than the first laser setting and comprising a selection of at least two parameters to provide to provide a second laser beam having an energy characteristic which causes at least the resin to carbonize; and irradiating a second portion of the plastic article with the second laser beam to produce a laser mark having a darker shade than the light shade.

15. The method of claim 14, further comprising the steps of:

(a) selecting a third laser setting different than the first and second laser settings and comprising a third selection of at least two parameters to provide a third laser beam having an energy characteristic which causes the resin to foam or at least the resin to carbonize;

(b) irradiating a third portion of the phosphorescent plastic article with the third laser beam to produce another laser mark having a different light shade or a different dark shade on the plastic article;

(c) repeating steps (a) and (b) a desired number of times to produce a plurality of different shades of light and dark laser marks on the phosphorescent plastic article.

16. A method for obtaining both light and dark laser marks on a phosphorescent plastic article, comprising the steps of:

providing a plastic article suitable for laser marking and having a composition comprising (i) about 50% to about 99% by weight of a thermoplastic resin that foams when heated, (ii) about 1% to about 50% by weight of a phosphorescent phosphor pigment, and optionally zero to about 10% by weight of a lubricating agent, zero to about 2% by weight of a whitening pigment and zero to about 20% by weight of an inert filler;

providing a laser having a principal wave length, a preselectable beam aperture and scanning velocity, and at least two variable laser parameters selectable from the group consisting essentially of an amperage from a range of amperages, a pulse frequency from a range of pulse frequencies, a pulse duration from a range of pulse durations, an energy density from a range of energy densities, a peak power from a range of peak powers, and a pulse energy from a range of pulse energies, wherein each individual selection of two or more parameters comprises a laser setting that provides a laser beam having an individual laser energy characteristic;

selecting a first laser setting comprising a selection of at least two parameters to provide a first laser beam having an energy characteristic which causes the resin to foam;

irradiating a first portion of the phosphorescent plastic article with the first laser beam to produce a laser mark having a light shade;

selecting a second laser setting different than the first laser setting and comprising a selection of at least two parameters to provide to provide a second laser beam having an energy characteristic which causes at least the resin to carbonize; and irradiating a second portion of the plastic article with the second laser beam to produce a laser mark having a darker shade than the light shade.

17. The method of claim 16, further comprising the steps of:

(a) selecting a third laser setting different than the first and second laser settings and comprising a third selection of at least two parameters to provide a third laser beam having an energy characteristic which causes the resin to foam or at least the resin to carbonize;

(b) irradiating a third portion of the phosphorescent plastic article with the third laser beam to produce another laser mark having a different light shade or a different dark shade on the plastic article;

(c) repeating steps (a) and (b) a desired number of times to produce a plurality of different shades of light and dark laser marks on the phosphorescent plastic article.

18. A molded, extruded or formed phosphorescent plastic article having both light and dark indicia laser marked thereon according to the method of claim 16, the article having a composition that comprises (i) about 50% to about 99% by weight of a thermoplastic or a thermosetting resin, (ii) about 1% to about 50% by weight of a phosphorescent phosphor pigment resin, and optionally zero to about 10% by weight of a lubricating agent, zero to about 2% by weight of a whitening pigment and zero to about 20% by weight of an inert filler, wherein the resin is an addition or condensation polymer selected from the group consisting essentially of polyesters, polystyrene, high impact polystyrene, styrene-butadiene copolymers, impact modified styrene-butadiene copolymer, poly-α-methyl styrene, styrene acrylonitrile copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polybutylene terephthalate, polyarylates, polyarylene sulfides, polyether ketones, and copolymers, grafts, blends, and mixtures thereof.

\* \* \* \* \*